(12) United States Patent
Shiels et al.

(10) Patent No.: US 6,260,194 B1
(45) Date of Patent: *Jul. 10, 2001

(54) INFORMATION HANDLING FOR INTERACTIVE APPARATUS

(75) Inventors: Martin A. Shiels, Brighton; Richard S. Cole, Redhill; Paul J. Rankin, Horley; Rosa Freitag, London, all of (GB)

(73) Assignee: U.S. Philips Corporation, New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/004,021

(22) Filed: Jan. 7, 1998

Related U.S. Application Data

(63) Continuation of application No. 08/705,584, filed on Aug. 29, 1996, now Pat. No. 5,754,770.

(30) Foreign Application Priority Data

Aug. 31, 1995 (GB) .................................................. 9517806

(51) Int. Cl.⁷ ............................ H04N 7/087; G06F 17/00
(52) U.S. Cl. ..................... 725/134; 725/137; 725/142; 345/328; 348/563
(58) Field of Search .................................. 348/7, 12, 13; 345/327, 326, 328, 302, 357; 709/217; 705/501; 725/135–142

(56) References Cited

U.S. PATENT DOCUMENTS

| | | | |
|---|---|---|---|
| 4,264,924 | * | 4/1981 | Freeman ................................. 348/11 |
| 4,264,925 | * | 4/1981 | Freeman ................................. 348/11 |
| 4,569,026 | * | 2/1986 | Best ..................................... 345/327 |
| 5,585,858 | * | 12/1996 | Harper et al. .......................... 348/13 |
| 5,602,582 | * | 2/1997 | Wanderscheid et al. ............... 348/13 |
| 5,612,742 | * | 3/1997 | Krause et al. ........................ 348/385 |
| 5,664,046 | * | 9/1997 | Abecassis ............................. 386/125 |
| 5,682,525 | * | 10/1997 | Bouve et al. ......................... 709/217 |
| 5,708,846 | * | 1/1998 | Ryan ..................................... 395/827 |
| 5,729,471 | * | 3/1998 | Jain et al. .............................. 348/13 |
| 5,737,552 | * | 4/1998 | Lavalle et al. ......................... 348/13 |
| 5,758,072 | * | 5/1998 | Filepp et al. ......................... 709/217 |
| 5,781,730 | * | 7/1998 | Reimer et al. ......................... 348/13 |
| 5,799,157 | * | 8/1998 | Escallon ............................... 709/217 |

* cited by examiner

*Primary Examiner*—Andrew Faile
*Assistant Examiner*—Reuben M. Brown
(74) *Attorney, Agent, or Firm*—Gregory L. Thorne

(57) ABSTRACT

An interactive entertainment apparatus and a method for controlling the same are described, in which the apparatus presents to the user a branch structured narrative (90), and user input determines which path (A,B) is followed at at least one narrative branch point (92). The user is enabled to selectively capture predetermined pieces of narrative information at interaction points (72) and subsequently reintroduce them at a later interaction point (73). Branch point selection is then handled by the apparatus in dependence on which information was reintroduced and at what point in the narrative. On-screen guidance is provided to the user in terms of interaction point indicators, and reminder artefacts for captured information in the form of miniaturised still pictures from the narrative.

8 Claims, 5 Drawing Sheets

INFORMATION HANDLING FOR INTERACTIVE APPARATUS

CROSS REFERENCE TO RELATED APPLICATIONS

This is a divisional of application Ser. No. 08/705,584, filed Aug. 29, 1996 now U.S. Pat. No. 5,754,770.

The present invention relates to interactive entertainment systems and, in particular, to such systems in which the user is able to control, directly or indirectly, the path of a narrative or plot line.

An example of such a system providing direct control is described in U.S. Pat. No. 4,305,131 to Robert M. Best, and comprises a motion picture system in which the viewer is treated as a character in the narrative. At branch points in the narrative, a character on screen will ask a question of the viewer: the viewer is provided with a hand held menu screen on which two or more command words appear, which words are amongst the limited vocabulary of a speech recognition unit of the system. The branch taken by the narrative will depend on how the viewer responds to the on-screen characters question, that is to say which of the command words is spoken by the viewer. The multiple story lines are held on optical disc as independently addressable video frames, blocks of compressed audio and/or cartoon graphics.

A drawback of systems such as that of Best is that the options presented to the user when prompting a choice will often, to some extent, tell the user what is going to happen next. Whilst this may be a desirable feature in games-oriented entertainments where the user is attempting to direct the selected pathway such as to reach a particular goal, in story-based narrative entertainments, such "give away" interaction can greatly reduce the users sense of anticipation, surprise and enjoyment.

It is therefore an object of the present invention to provide a novel method of, and apparatus for, interacting with a narrative based entertainment, where the process of interacting does not require the user to specify what is to happen next.

In accordance with the present invention there is provided a method for user control of an interactive entertainment apparatus, where the apparatus presents to the user a branch structured narrative, and user input determines which path is followed at at least one narrative branch point, characterised in that the user is enabled to selectively capture one or more predetermined information items from the narrative and subsequently recall the or each information item, and at at least one subsequent branch point the selection of the branch path followed is made by the apparatus in dependence on the occurrence or otherwise of user-directed recall of a predetermined one or ones of the said captured information items.

With such a technique, the user is no longer required to directly specify which path the narrative will take: instead the user is required to decide which information to capture, and when to re-introduce it to the narrative, with no clear indication being given or certainty for the user as to what effect the re-introduction will have.

Also in accordance with the present invention there is provided an interactive entertainment apparatus operable to output sequences of image frames comprising a user-influenced path through a branch structured narrative, the apparatus comprising: a source of image frame data for all branch structure paths of the narrative; branch storage means for data defining the narrative branch structure; user operable input means; branch selection means coupled to the branch store and operable to determine when the narrative reaches a branch point and to call one of two or more image frame sequences from the image frame data source in dependence on the user input; and an output for the selected image frame sequences; characterised in that the apparatus further comprises narrative memory means operable to capture and subsequently recall one or more predetermined information items from the narrative in response to user input, with the or each predetermined information item having a respective information value associated with it, wherein the branch selection means is further operable to detect the or each user-directed recall of an information item and, for at least one branch point of the narrative, the branch selection is made in dependence on the information values of said recalled information item or items.

The apparatus may suitably include at least one character memory assigned to a character of the narrative, in which memory is stored a respective character value: with such a memory, user-directed recall of at least one captured user information item may cause that character value to be modified by the respective information item value and, for at least one branch point of the narrative, the branch selection may suitably be made in dependence on the modified character value.

The recall of information items may suitably be associated with a "flashback" of the portion of the narrative from which they were obtained. To enable this, the or each captured information item stored in the narrative memory may include a call address for an image frame sequence, with the recall of an information item triggering recall from source and output of the respective stored image frame sequence. Alternatively, where a large storage capacity is available to the narrative memory, the or each captured information item stored in the narrative memory may include a sequence of image frames, with the recall of an information item triggering output of the respective stored image frame sequence. Audio flashbacks may be provided instead of, or in addition to, the visual replays and different treatments may be applied to the flashbacks as will be described.

The apparatus may be provided with image generation means coupled to the narrative memory which generate a visual artefact pertaining to the or each captured information item and present the or each artefact overlying a part of an image frame. These artefacts may suitably be reduced size still image frames taken from the narrative.

To maintain storage and computational capacity of the apparatus within acceptable limits, the user may only be permitted to capture and recall information items from the narrative during predetermined periods specified by the branch structure. To alert the user to these interaction periods, an image generation means as described above may be used to generate a visual indicator during them.

To further control storage levels, a limit may be placed on the number of captured information items which the user may hold at any given time and, where this said limit has been reached, the capture of a further information item may result in the deletion of the stored first-captured information item. Alternatively, to increase the users choice, when the said limit has been reached, the user may be enabled to delete a selected one or ones of the captured and stored information items prior to capture of a further information item.

Further features and advantages of the present invention will become apparent from reading of the following description of preferred embodiments of the present invention, given by way of example only, and with reference to the accompanying drawings in which.

Figure 5:
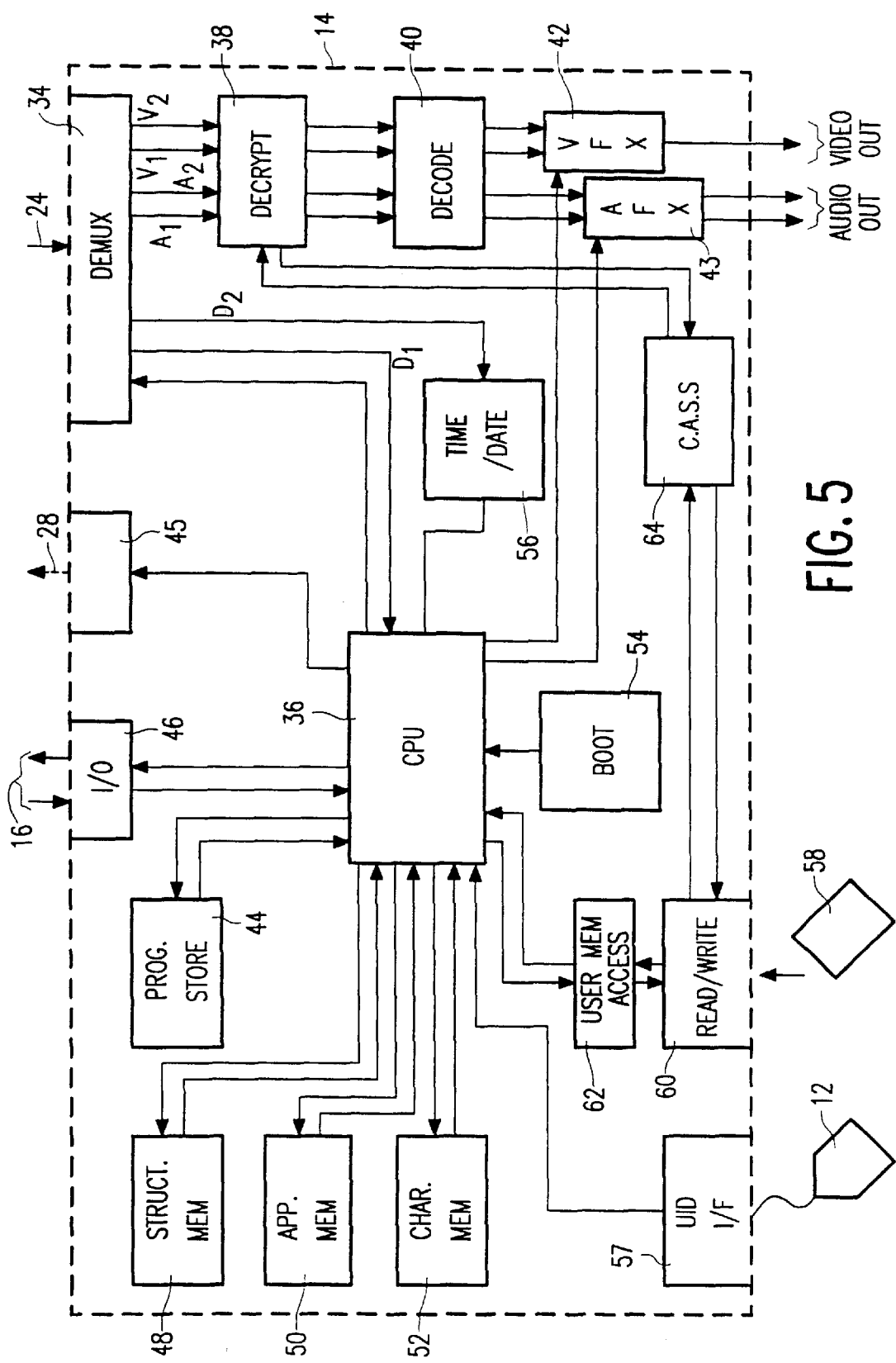
FIG. 5 is a schematic representation showing the user interface apparatus of FIG. 3 greater detail.
Figure 8:
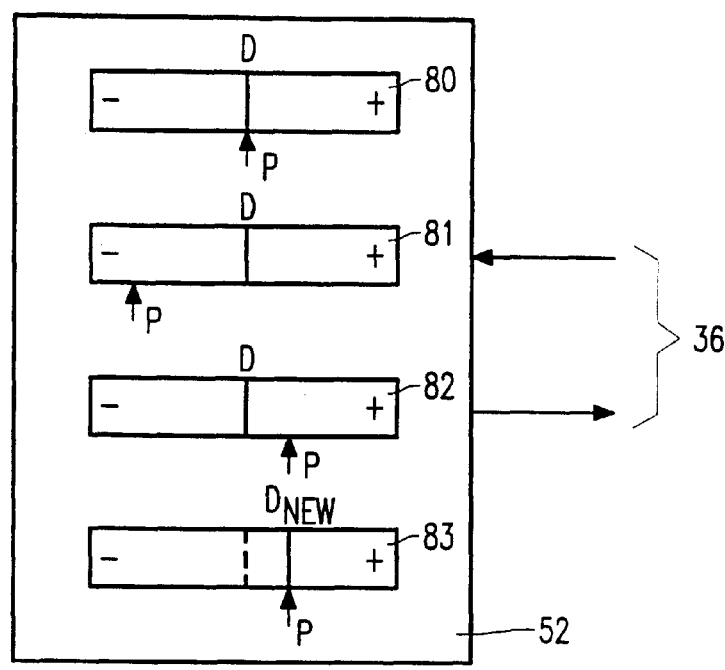
Figure 9:
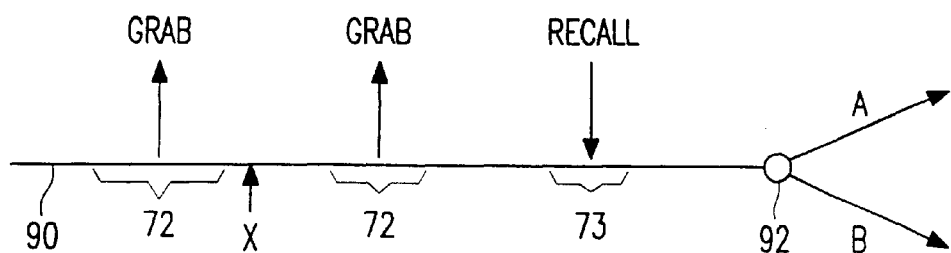

FIG. 8 schematically illustrates operation of the character memory in the interface apparatus of FIG. 5;

FIG. 9 represents a segment of branch narrative structure; and

Figure 10:
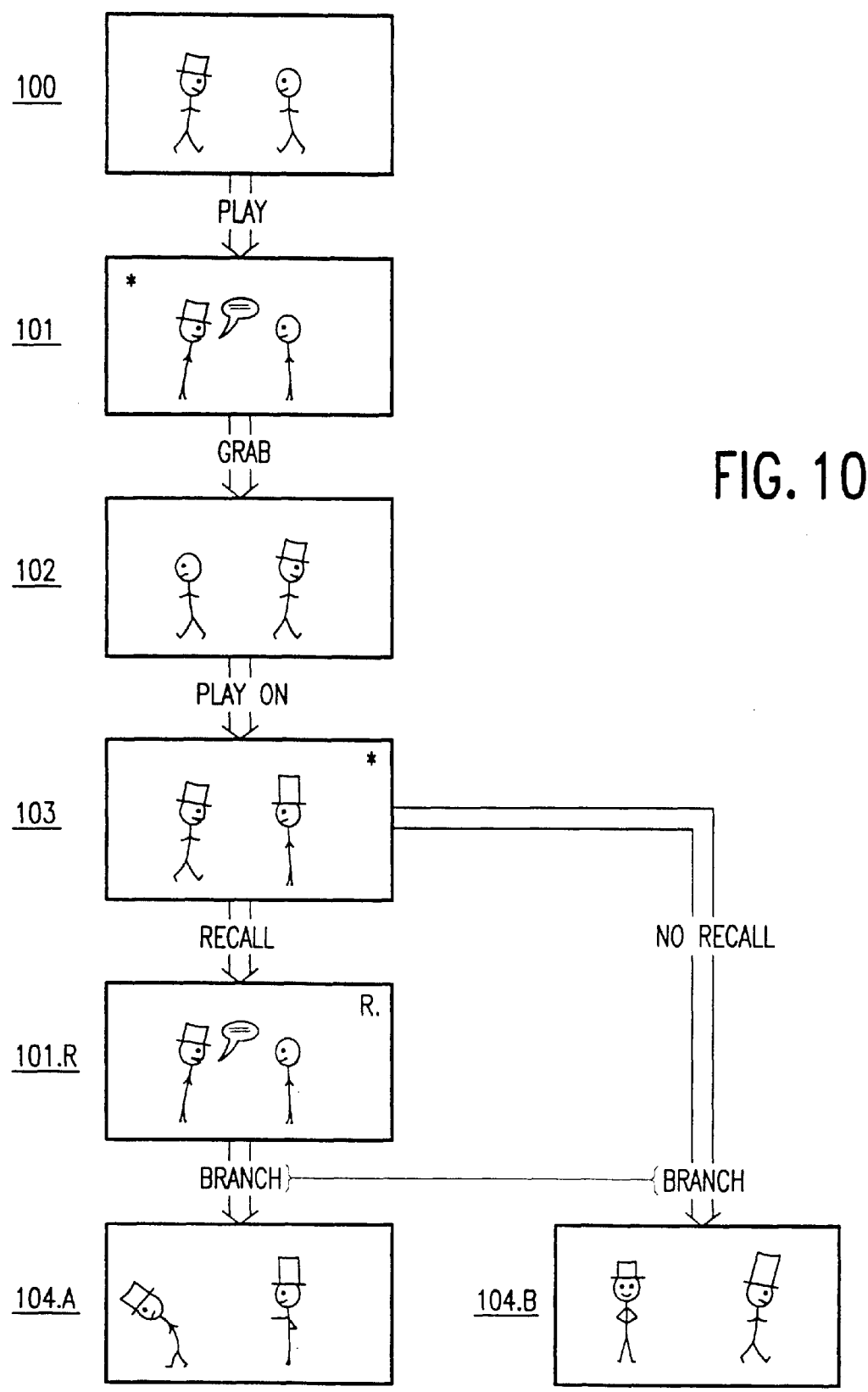

FIG. 10 shows a displayed image sequence following a part of the branch narrative structure of FIG. 9.

In the following examples, we concentrate on the case where the image frames accompanying the narrative are video frames, although as will be understood (and described), the present invention is equally applicable to sequences of animated image frames, and compound frames comprised of both video and animation.

Figure 1:
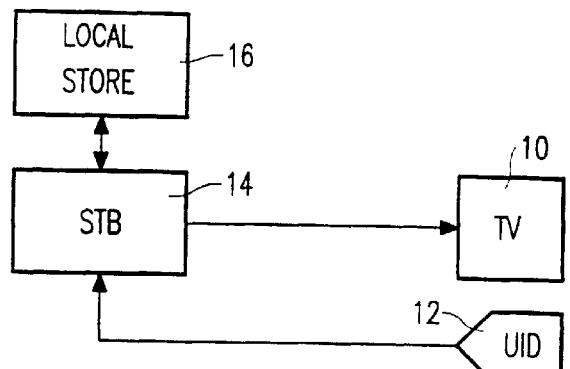
FIGS. 1 to 4 show differing combinations of material source supplying a user interface apparatus embodying the present invention.

FIGS. 1 to 4 represent a number of different ways by which an interactive narrative may be supplied to a user. In each case, the user views the received narrative on a monitor screen 10, suitably a television set, and is provided with an input device (UID) 12 for inputting commands, responses or other data as required by the particular application. In addition, the user is provided with an interface apparatus in the form of a set top box (STB) 14 to which the narrative source or sources are coupled, to which the user commands are input, and from which the television receives the signal for display. The user input device 12 has a few simple controls as required by the application, for example three select buttons and up/down/left/right shift controls or a joystick, and may be hard wired to the STB as shown in FIG. 1, or connected by infra-red (IR) link in known manner as in FIG. 2.

Figure 2:
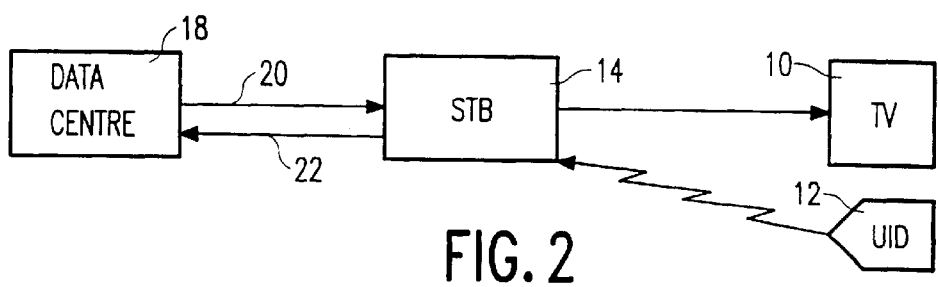
Figure 3:
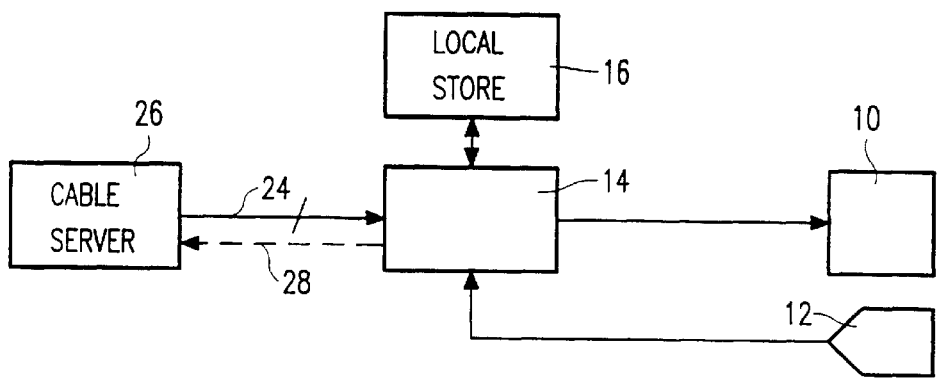
Figure 4:
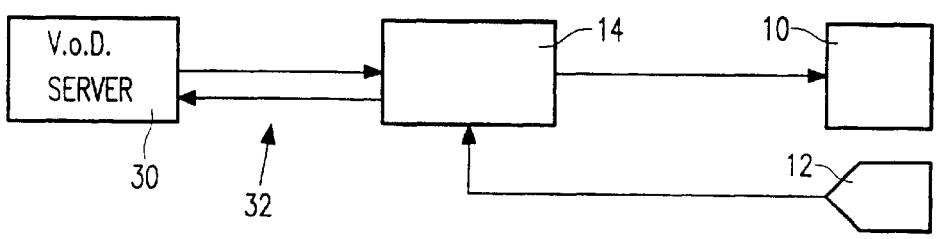

In the embodiment of FIG. 1, the narrative video and structure together with subsidiary information is supplied wholly from a local data source 16, such as a compact disc player or CD-ROM. In the embodiment of FIG. 2, the narrative video, structure and other information is supplied wholly from a remote source 18 via a data network 20, with user commands being sent to the remote source via a return path 22 of the network. In the embodiment of FIG. 3, the narrative video and other information is supplied as multiplexed channels on a single line 24 from a remote source 26, such as a cable television network server and is supplemented by information such as the structure from the local data source 16. In order to avoid the need for mass memory at the user site a return line 28 may be provided to give the user site at least partial control over the information sent out from the remote store, for example to enable the recall of identified portions of video out of sequence. In the embodiment of FIG. 4, the narrative is supplied via a Video on Demand (VoD) system from a server 30 over a network 32, access to which may require the user to enter an identification code or insert a smart card or similar into an appropriate card reader to enable decryption of encrypted signals. As will be described, rather than providing separate units for decryption and card reading, these functions may be provided within the STB.

FIG. 5 shows the internal structure of the STB 14 when set up for the configuration of FIG. 3, that is to say with input from both remote source 26 via network 24 and local source 16. The incoming signal from the network 24 contains a number of independent service components (audio, video and data streams) multiplexed together. In this example, the signal contains two data streams $D_1$ and $D_2$ the functions of which are explained below, together with two audio streams $A_1$ and $A_2$ (for example left and right channels of a stereo audio signal) and two video frame streams $V_1$ and $V_2$ The multiplexed signal is received by a demultiplexer 34 which splits it into the separate components under control of a processor 36. Before being output from the STB the audio and video may pass through decryption 38 and decoding 40 stages, the video signals may be processed 42 to provide video effects such as picture-in-picture (PIP), and the audio may also be treated 43, as will be described below.

The first of the data streams $D_1$ is input to the processor 36 and contains program information specifying how the processor is to handle the audio and video streams and other information specific to features of the particular interactive narrative. This program information is held by the processor in program store 44. A specification for the branch structure of the narrative may be downloaded via $D_1$ (in response to a processor call on the network return path 28, via interface 45) or it may be read from local storage 16 via interface 46, with the processor sending track addressing and play commands as required. The branch structure is stored in structure memory 48, with further memories being provided for application features 50 and character features 52, the particular functions of which will be described below. Whilst shown in the Figure as separate stores, it will be readily appreciated that the program store 44 and the structure, application and character memories, 48, 50, 52 may be provided as respective areas of a single memory, provided that the more detailed addressing and associated access times for the larger memory do not unduly affect performance.

On powering up of the STB 14, a bootstrap loader 54 initialises the processor and instructs it to call for the branch structure and program information from the appropriate sources. Alternatively, and more simply, the boot strap loader 54 may just initiate the calling up of the program information, with the first instruction of that program information being for the processor 36 to call up the branch structure and store it in program store 44.

Some narrative applications may require information as to the current date and time of day and, to avoid the need for the STB to maintain an accurate, non-volatile, clock source, a time/data store 56 is provided, with the timing information being updated at regular intervals from the remote source using data component stream $D_2$ as shown. For the FIG. 1 embodiment, where there is no remote source, the data/time information might be obtainable from the local source if that maintained its own clock.

Signals from the user input device (UID) 12 are received by the STB at UID interface 57 and, from there passed to the processor 36. If, as in FIG. 2, the UID 12 is coupled to the STB via infra-red link, the interface 56 would include a suitable infra-red receiver.

For some forms of narrative entertainment, the narrative may be sporadic or episodic with the equipment being switched off in between episodes or sessions. To avoid the user being forced to re-start from scratch each time the equipment is switched on, a non-volatile user memory is provided in which features such as the user's current position within a narrative, user preferred system settings etc are stored. The user memory may suitably be held on a removable storage device such as a smart card 58 with the STB having a suitable card reader 60 with access to that area of the card storing the user memory being made via user access control 62: user memory access control 62 may, alternatively, be a purely software route executed within processor 36.

In some circumstances, the interactive entertainment may be provided by a remote server on a "pay-per-play" basis with the audio and video signals being transmitted in encrypted form and requiring particular key codes to enable them to be decrypted. In such a situation, the smart card 58 providing the non-volatile user memory may have a further function as a part of the decryption system. In such a case, the smart card 58 would carry a series of the codes, one or more of which would be required by decryptor 38 to decrypt the audio and video signals. Data stream $D_1$ would contain an identifier for one or more of the codes which identifier would be passed to a conditional access sub-system (CASS) 64, which in turn would use the identifier to address the stored codes on the smart card (via card reader 60) and, having obtained the necessary code or codes from the smart card, the CASS 64 would forward the obtained codes to the decryptor 38.

Where the video and/or audio signals are transmitted in compressed form, for example discrete cosine transform coded video according to MPEG standards, the decoder 40 may be provided. A switchable by-pass to the decoder (not shown) may be provided for the case where the display (television) is already equipped with, and set up for, decoding of the standard.

The video effects stage 42 is operated under control of the processor 36 to provide those features of the displayed image which are locally generated under the direction of the application program and/or user input, rather than being present in the video data supplied from the remote or local source. Such features may include menu bars, user movable cursors, system messages and so forth. As previously mentioned, one of the possible video effects is picture-in-picture (PIP) where the in-screen picture may be used to provide supplementary or future historical information about the narrative to the user. In one possible arrangement, video data streams $V_1$ and $V_2$ may synchronously show a particular scene of the narrative being played out, but with each being presented through the "eyes" of a different character within the scene.

Where the narrative is composed of animated (rather than video) images, the effects stage 42 may handle the rendering of the images, with the remote source supplying the source and instruction data. Whilst this would require a significant increase in processing power for the STB, the user interaction could then include modification of the images themselves in addition to directing narrative branch point selection. As previously mentioned, the effects stage may also handle compound images, taking a video sprite and overlying it on a locally-generated background image.

The audio effects stage 43 may be used for processing of the received audio signals $A_1$, $A_2$ in order to generate effects such as echo, without requiring supply and/or storage of multiple versions of an audio segment. The stage may also be used for local generation of some sound effects, suitably those required as immediate response to a user input, with basic waveform data, call commands and so forth being downloaded to the application memory 50 at the start of a session or on initialisation.

Figure 6:
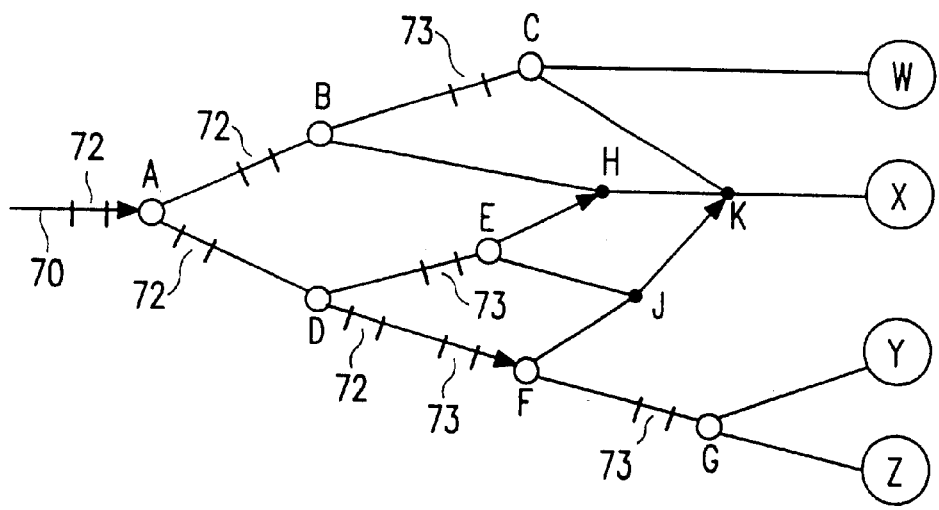
FIGS. 6 and 7 represent two different arrangements of branch narrative structure.

Interaction with different forms of narrative structure are possible, by use of the STB of FIG. 5 and using various of the facilities it provides. FIG. 6 shows a branched narrative structure starting with a common introductory portion 70, which would serve to set the scene for the narrative, introduce the viewer to the characters and so forth. At branch nodes A to G a decision is required as to which path the narrative will take, with the user navigating or being led through the network of possible story lines to reach one of the four possible endings W to Z. In order to avoid an "explosion" of possible endings, which would require a large amount of video data to be available for a relatively short narrative, some paths combine (at nodes H, J and K) such that some sections of the narrative (for example H to K) may appear within the narrative regardless of which path is chosen at node A for example. In order to maintain the user's "immersion" in the narrative story line it is important that, at both branching and combining nodes there is no discernable break in the video stream. Detailed techniques for seamless joining of video sequences are described in, for example, our co-pending United Kingdom patent applications 9424429, 9424436 and 9424437 (our references: PHB 33952, PHB 33950 and PHB 33951). A principal requirement for seamless joining is that the system has sufficient time to call up the selected next video segment and synchronise its start to the end of the present sequence. To enable this, one or more finite interaction periods prior to the end of the present video sequence are provided, for example as shown at 72 and 73 in FIG. 6, during which period the user may interact via UID 12 (FIG. 1) as will be described. The location of the interaction periods 72 and 73 relative to the narrative is a feature of the structure, and is held in structure memory 48 of the STB (FIG. 5).

The existence of an interaction period may be indicated to the viewer in a number of different ways. For example, an asterisk may appear on the screen or a menu of possible options may be displayed: this menu is preferably provided via the video effects unit 42 of the STB such that, as soon as the user has selected an item, the menu may be removed from the screen to minimise the intrusion. The positioning of the menu should be such as to avoid blocking the on-screen story and may be provided as, for example, a picture-in-picture or as a pull-up menu which the user can access during an interaction period.

Each branch node of the narrative is preferably provided with a default setting such that, if there is no user input during the interaction period 72 or 73, then the narrative will continue along the default path without stalling for lack of instruction.

The audio accompaniment to the video sequences of FIG. 6 is not tied to the video itself but instead is called up as a feature of the narrative structure. This enables sections of the audio (such as dramatic or background music) to be re-used during the course of the narrative, for example to provide an audio, rather than a visual, cue to the user that interaction may take place or is required. As mentioned, some of the audio may also be generated locally.

Figure 7:
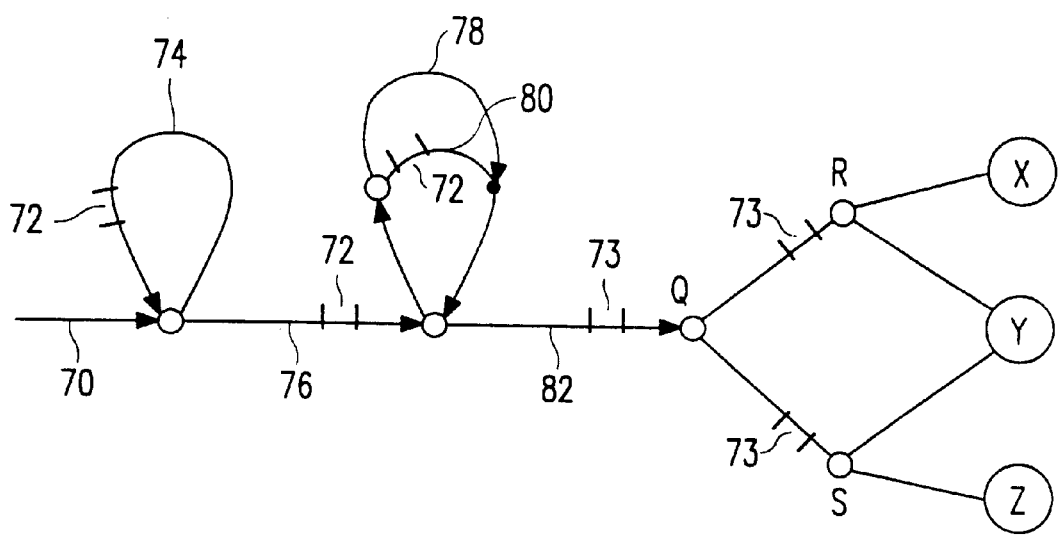

An alternative form for the branch structure is shown in FIG. 7. As before, the narrative starts with a common introductory portion 70 leading to a first branch node L. Instead of a diverging branch output, branch node L provides access to a narrative loop 74 which returns to node L at its end, following which the narrative continues along path 76 to another branch node M. The narrative loop 74 may be used to enable the viewer to access background or subsidiary information to the narrative during interaction periods within the loop: the default setting for node L would be to continue with narrative section 76. At node M, a further narrative loop is provided having within that loop a further branch node N and recombining node P linked by two possible loop narrative paths 78 and 80. Multiple loop nestings, as well as loops within loops may be provided. As shown, the narrative loop structure may be combined with a diverging branch structure with diverging branch node Q following narrative section 82 and further branch nodes R and S leading to conclusion of the narrative at one of three possible endings X, Y or Z.

To avoid the requirement for user interaction prior to each and every branch point of the structure, path selection at some of the branch points is made dependent on previous interactions. FIG. 8 schematically represents how the character memory (52, FIG. 5) is arranged to provide the historical information. A number of sliding scales 80 to 83 are provided, each having a movable pointer P and a central default value D. On initialisation of the system, each of these sliders is given a start value and is assigned to a respective character or feature of the narrative, which characters or features will have an effect on the selection at at least one branch point during the course of the narrative. From initial settings at the default value D (or a different user-set value), the pointers will be moved up or down the scale as interactions related to that character take place. Using the narrative structure of FIG. 7, for example, the character "values" associated with each branch of the narrative prior to branch node Q may be as follows (note that interaction periods 72, 73 during which these values may be accessed are not shown in every branch of the Figure for reasons of clarity):

| Path | Value |
|------|-------|
| 70 | +1 |
| 74 | −4 |
| 76 | +2 |
| 78 | −2 |
| 80 | +2 |
| 82 | −1 |

The decision at branch node Q may then be set such that, if the accumulated character total (the pointer position) is greater than or equal to 0 then the path to node R will be followed, otherwise the narrative will proceed to node S. By following the default path of narrative sections 70, 76 and 82 (that is to say avoiding the loops) a pointer setting at +2 is achieved and the narrative will continue to node R. However, if the user chooses to enter loop 74 at node L, the narrative will proceed to node S unless the user has chosen also to go via narrative section 80 in the loop at node M.

In addition to the narrative sequence character values, the branch nodes themselves may have an effect on the stored character values, for example incrementing, decrementing or resetting to the default values. Also, the default values themselves may be movable with, for example, consistent or extreme pointer positioning on one side of the default leading to gradual movement of the default towards that side.

Rather than wholly automatic selection on the basis of accumulated character totals, this feature may instead be used to selectively lock or unlock certain paths of a narrative. The decision at branch node Q would then be available to the user only if they had accumulated sufficient character values earlier in the entertainment, and the "unlocked" branch might contain scenes where the character appears to address the user in a familiar manner, or scenes of personal revelations from characters. In situations where insufficient character values have been accumulated, the system may react to user-directed selection of a locked branch with a displayed and/or audio message (generated through video and/or audio effects stage 42,43) such as "Path Closed" to alert the user to the need to take different pathways on the next play of the entertainment. Alternatively, where only one unlocked path is available from a node, the visual and/or audio cues to the user to interact may suitably be suppressed and the unlocked path automatically selected as a default, such that the chance to interact may come as a surprise to the user on a subsequent playing.

Where the entertainment is episodic, the user is preferably provided with a chance to save settings at the end of a session. This would allow a record of current pointer settings to be stored on the smart card 58 and, rather than having to start with default value settings, the previous values could be re-established during initialisation at the start of the following session.

The preferred interaction technique uses both the character memory 52 and the application memory 54 of the STB and involves "grabbing" of information from the narrative during one or more interaction periods 72, as shown in the narrative structure segment of FIG. 9. During the narrative segment 90, one or more interaction periods 72 are provided during the course of which the user is enabled, on operation of the UID, to capture information relating to that part of the narrative. At a subsequent one of the interaction periods 73, the user can reintroduce the captured information to the narrative such as to affect the choice of narrative branches A or B following the next branch node 92.

The picture sequence example of FIG. 10 follows the segment structure of FIG. 9 from point X. The initial scene 100 has two characters (Fred and Barney) approaching in the street. This is part of the running narrative with which the user cannot interfere.

In the next scene 101, they are conversing and Fred is saying that he told his boss that he was not at work the previous day because he was ill, when in fact he went to a party. This potentially useful piece of information may have later relevance to the story and, whilst the conversation is taking place, the user is alerted to the fact that an interaction period 72 is currently open by an audio cue or an on-screen indicator such as the asterisk shown in the top left corner of the picture: the asterisk may suitably be generated by the STB video effects stage 42.

If the user decides to grab the information (which would simply require operating a "Capture" button on the UID), the source address for that video sequence would be written to the application memory to enable its subsequent recall. Additionally, a shrunken still image or some other visual reminder of the captured scene is generated.

In scene 102, Fred and Barney have concluded their conversation and go their separate ways. As the asterisk is not present, the user is alerted that this scene cannot be captured. The still picture reminder of the captured scene is shown at the bottom right corner of the current scene, suitably in a pull-up menu which the user can remove from display if it proves intrusive.

In scene 103, Fred is talking to his boss. This scene is another interaction point 73, but this time the user may recall captured scenes rather than capture further ones: this is indicated to the user by an asterisk in the top right corner of the screen. Where a number of scenes have been captured, they may be separately identified by, for example, the numbers 1–3 with the user entering the appropriate number via the UID to recall that scene.

If the user decides to recall the scene where Fred was talking to Barney, the selection of that scene will cause the STB processor 36 to read the source address for that scene from the application memory 50 and use it to call up the scene in question from the remote or local source as appropriate. The recalled scene 101.R then replaces the current one, providing a "flashback" of Fred's conversation with Barney.

The operation of recalling moves the narrative sequence along to the next branch node (92, FIG. 9) and the content (the narrative value) of the recalled sequence directly or indirectly affects the choice of branch. In a direct implementation, the recall of scene 101 at this point automatically selects branch A, in which Fred is fired for taking the day off: if the user chooses not to recall the scene during the interaction period of scene 103, that scene plays itself out until the branch point is reached, when branch B is followed and Fred keeps his job.

In an indirect implementation, one of the sliders in the character memory 52 (FIG. 8) may be assigned as "Fred's Job Prospects" on initialisation. If, during the course of preceding interactions, the character of Fred has accumulated a large positive value on this slider, the negative value associated with recalling scene 101 in the presence of Fred's boss may not be sufficient to generate a negative value for the slider at the branch decision point and Fred may still keep his job.

In an alternative implementation, the flashbacks may be purely audio with, for example, scene 103 entering a short (audio-muted) loop, being frozen, or being wholly or partially replaced by a still from scene 101 whilst the conversation audio from scene 101 is replayed. The option taken from the foregoing will to some extent depend on the form of the narrative. For example, "unfreezing" and continuing scene 103 following the flashback will be inappropriate if Fred's boss continues to talk to him as though unaware of the flashback, then suddenly (at the branch point) turns around and fires him. Entering a loop section may be appropriate if, for example, the interaction point is set to coincide with Fred's boss answering a telephone call during scene 103. The image of Fred's boss on the phone may be looped for 5 seconds for example and then continue to the branch point: scenes 104A and 104B would both commence with Fred's poss putting the phone down and, if the audio flashback has been recalled during the loop, scene 1 04A proceeds with the boss acting as if he had heard about Fred's day off over the telephone. If no recall has occurred, scene 104B proceeds with the boss acting as though the telephone call had been an inconsequential matter.

The flashback image or audio sequence may be a specially recorded sequence, which may be particularly useful where the original scene was lengthy with the flashback acting as an edited "highlight". The flashback play is suitably presented in such a way as to differentiate from conventional play; video may be presented in a smaller area of the screen and/or with some arrangement of border generated by the video effects unit 42, and audio may be provided with echo and muting effects or with the accompaniment of a particular piece of backing music through audio effects unit 43.

Storage for flashback sequences may suitably be tied to that of the original sequence, with each flashback stored at an address location corresponding to that of the original but offset by constant value, such as to simplify calling of the sequence. Alternatively, the flashback sequences may be stored separately with a separate address table downloaded to the apparatus along with the main table for the narrative sequences, or each sequence capable of capture may be accompanied by data (for example on data channel $D_1$) identifying the address for the flashback sequence.

In order to control the screen and memory space associated with a captured scene, a limit is placed on the number of scenes which may be held at any time. When that limit is reached, the user may be prevented from capturing further scenes until one of those stored has been recalled or deleted. Alternatively, capturing a scene where the limit has already been reached may be the trigger for the system to automatically delete the "oldest" stored scene. Thus, in addition to the user being required to select when to recall a scene, they would also have to use their skill and judgment to decide which scenes would be most useful to capture.

In order to provide a lower degree of interactivity for those that desire it, a limited selection of choice may be provided beyond the running of a single default path, with the user having the simple option of "grab" or "default" at each interaction point, and each captured sequence being keyed to replay at a particular point. This is accompanied by automated selection at branch points following replay. With such an arrangement, the user simply chooses to go off the default path from time to time with the system triggering and following the consequences.

From reading the present disclosure, other modifications and variations will be apparent to persons skilled in the art. Such modifications and variations may involve other features which are already known in the art and which may be used instead of or in addition to features already described herein. For example, some of those features described in relation to the STB (14, FIGS. 1 to 5) may instead be provided within a personal computer and others within a television or display unit. The reference to an apparatus in the following claims will be readily understood to cover all arrangements where the various recited features operate together in the manner described, regardless of whether those features are provided in a single unit or distributed amongst a number of interconnected units.

Although claims have been formulated in this application to particular combinations of features, it should be understood that the scope of the disclosure of the present application also includes any novel feature or combination of features disclosed herein either explicitly or implicitly, whether or not relating to the same invention as presently claimed in any claim and whether or not it mitigates any or all of the same technical problems as does the presently claimed invention. The applicants hereby give notice that new claims may be formulated to such features and/or combinations of such features during prosecution of the present application or of any further application derived therefrom.

What is claimed is:

1. A set top box (STB) operable to output sequences of image frames comprising a user-influenced path through a branch structured narrative, the STB comprising:

memory for storing image frame data for all branch structure paths of the narrative;

branch storage means for data defining the narrative branch structure of the narrative;

user operable input means;

branch selection means coupled to the branch store means and operable to determine when the narrative reaches a branch point and to call one of two or more image frame sequences from the image frame data source in dependence on the user input;

an output connected to the STB and configured to output the selected image frame sequences; and narrative memory means operable to capture and subsequently recall one or more predetermined information items from the narrative in response to user input, with the or each predetermined information item having a respective information value associated with it;

said branch selection means further operable to detect the or each user-directed recall of an information item and, for at least one branch point of the narrative, the branch selection is made in dependence on the information values of said recalled information item or items.

2. The STB as claimed in claim 1, wherein said memory comprises said narrative memory means.

3. A method for user control of an interactive apparatus, comprising the step of:

presenting to the user by said interactive apparatus, a branch structured narrative;

determining which path is selected at least at one narrative branch point based on user input by a user;

enabling the user to selectively capture a predetermined information item from the branch structured narrative; and selecting at least at one subsequent branch point, by said interactive apparatus, the branch path based on the occurrence or otherwise of user-directed recall of the predetermined captured information item.

4. An apparatus for presenting to a user a branch structured narrative wherein when the narrative reaches a branch point the user is presented with one of a plurality of image frame sequences in dependence on user input to determine a path of the branch structured narrative, the apparatus comprising a processor configured to capture and subsequently recall an information item from the narrative in response to user input and configured to determine branch selection at least at one branch point in dependence on if a user-directed recall of an information item occurs.

5. The apparatus of claim 4, wherein the captured information item has an associated information value that is affected by the path of the branch structured narrative and wherein the branch point selection at the at least one branch point is made in dependence on the associated information value as affected by the path of the branch structured narrative prior to the at least one branch point.

6. The apparatus of claim 4, wherein the processor is configured to present to the user an indication if a user-directed capture of an information item has occurred.

7. The apparatus of claim 6, wherein the indication is a visual artifact pertaining to the captured information item.

8. The apparatus of claim 7, wherein the visual artifact is presented to the user overlaid on the branch structured narrative.

* * * * *